US 9,952,399 B2

(12) United States Patent
Schuster et al.

(10) Patent No.: US 9,952,399 B2
(45) Date of Patent: Apr. 24, 2018

(54) CONNECTOR PANEL FOR PLUG-IN UNITS OF A TELECOMMUNICATION SYSTEM AND ASSOCIATED SHELF (71) Applicant: Xieon Networks S.à.r.l., Senningerberg (LU)

(72) Inventors: Siegwald Schuster, Grafelfing (DE); Christian Polacek-Attenberger, Munich (DE)

(73) Assignee: Xieon Networks S.a.r.l., Senningerberg (LU)

( * ) Notice: Subject to any disclaimer, the term of this patent is extended or adjusted under 35 U.S.C. 154(b) by 0 days.

(21) Appl. No.: 15/502,709

(22) PCT Filed: Aug. 12, 2015

(86) PCT No.: PCT/EP2015/068566
§ 371 (c)(1),
(2) Date: Feb. 8, 2017

(87) PCT Pub. No.: WO2016/030192
PCT Pub. Date: Mar. 3, 2016

(65) Prior Publication Data
US 2017/0235072 A1 Aug. 17, 2017

(30) Foreign Application Priority Data
Aug. 29, 2014 (EP) .................................... 14182752

(51) Int. Cl.
*H04J 14/02* (2006.01)
*G02B 6/44* (2006.01)
(Continued)

(52) U.S. Cl.
CPC ......... *G02B 6/4452* (2013.01); *G02B 6/3897* (2013.01); *H04B 10/808* (2013.01); *H04J 14/02* (2013.01)

(58) Field of Classification Search
CPC .... G06F 1/186; H05K 7/1429; G02B 6/3897; G02B 6/4452; H04Q 1/15
(Continued)

(56) References Cited

U.S. PATENT DOCUMENTS 5,404,416 A * 4/1995 Iwano .................. G02B 6/3807
385/60
5,883,998 A 3/1999 Stevens et al.
(Continued)

FOREIGN PATENT DOCUMENTS

WO 2014/033616 A2 3/2014

OTHER PUBLICATIONS

International Search Report, PCT/EP2015/068566, dated Dec. 10, 2015, 10 pages.

*Primary Examiner* — Don N Vo
(74) *Attorney, Agent, or Firm* — Nelson Mullins Riley & Scarborough LLP (57) ABSTRACT

A connector panel for plug-in units in a telecommunication system, the telecommunication system including a sub-rack or shelf having a backplane for power supply of a number of N plug-in units within the shelf and for enabling the N plug-in units within the shelf to communicate with each other; wherein the connector panel is an entity separate from the backplane and includes a number of m connectors providing an interface between n dedicated plug-in units among the N plug-in units within the shelf, with 2≤n<N and m≥n; and wherein the connector panel is configured to be removably attached at an interior wall of the shelf.

18 Claims, 4 Drawing Sheets

(51) Int. Cl.
*H04B 10/80* (2013.01)
*G02B 6/38* (2006.01)

(58) Field of Classification Search
USPC .......................................................... 398/82
See application file for complete search history.

(56) References Cited

U.S. PATENT DOCUMENTS

| | | | | |
|---|---|---|---|---|
| 5,909,298 A * | 6/1999 | Shimada | ............... | G02B 6/4452 |
| | | | | 385/134 |
| 2007/0081308 A1* | 4/2007 | Ishida | ................... | H05K 7/1492 |
| | | | | 361/724 |
| 2009/0144568 A1* | 6/2009 | Fung | ..................... | G06F 1/3203 |
| | | | | 713/300 |

\* cited by examiner

CONNECTOR PANEL FOR PLUG-IN UNITS OF A TELECOMMUNICATION SYSTEM AND ASSOCIATED SHELF

CROSS REFERENCE TO RELATED APPLICATIONS

This application is a 35 U.S.C. 371 national stage filing of International Application No. PCT/EP2015/068566, filed on Aug. 12, 2015, which claims priority to European Patent Application No. 14182752.7 filed on Aug. 29, 2014. The contents of the aforementioned applications are hereby incorporated by reference in their entireties.

FIELD

The invention relates to a connector panel for plug-in units of a telecommunication system and an associated shelf.

BACKGROUND

The invention is applicable, for example, to a telecommunication system using optical data transmission technology. One specific example of using this invention is in a long-haul dense wavelength division multiplexing (DWDM) transmission system, such as the hiT 7300 Optical Packet Transport platform of Coriant GmbH & Co. KG, DE. This platform is optimized for high-capacity transport of data in optical long-haul networks, at bit rates from 2.5 Gbit/s to 100 Gbit/s per wavelength and further is designed to be upgraded for 400 Gbit/s and more in the future. The key building blocks of this system include optical amplifiers, routers, optical add-drop multiplexers (OADMs), reconfigurable optical add-drop multiplexers (ROADMs), photonic cross-connects (PXCs) and additional function units, such as "hot-pluggable" transponders and multiplex transponders, with tunable XFPs (small form-factor pluggable transceivers), SFPs (10 Gbit/s small form-factor pluggable transceivers) and CFPs (100 Gbit/s form-factor pluggable transceivers) that enable easy configuration.

These and other functional units usually are provided as plug-in units to be assembled in sub-racks or shelves in a rack of a telecommunication system, such as an optical DWDM system, and may be configured according to customer demand.

Within each shelf, power supply of and communication between the plug-in units is usually performed via a so-called backplane, said backplane also connecting the plug-in units with a control board/unit usually also provided within each shelf.

U.S. Pat. No. 6,822,874 B1 and WO 2005/051006 A1 describe examples of modular telecommunication platforms using plug-in units. U.S. 2008/0304428 A1 and EP 2051453 A1 describe optical transmission networks which also are examples of systems to which the invention can be applied. Any of the network elements described therein provide examples of the plug-in units addressed above. The hiT 7300 platform of Coriant is further described in publications of Coriant and its predecessor, Nokia Siemens Networks, such as at www.coriant.com/products/hiT7300.asp. Of course, the invention is not limited to any particular platform, but can be used for any type of telecommunication system and, more specifically, optical DWDM systems.

In these kinds of systems, for particular applications or for purposes of upgrading, it may be desirable to combine two or more plug-in units into a specific package or cluster. A cluster is formed, for example, if more than one printed wiring board (PWB) is needed for one functional unit with more than one interface to the backplane. When combining several PWBs into one functional unit, dedicated connections between the PWBs are needed. In particular when clusters are formed for upgrading a telecommunication system, the preinstalled backplane often will not support the necessary dedicated connections. In the past, this issue has been addressed either by redesigning the backplane to provide the necessary connections, by configuring the printed wiring boards in such a way that a number of different printed wiring boards are combined and connected directly using board-to-board connectors to form multi-PWB plug-in module, or by combining several printed wiring boards to form a cluster using more than one backplane connection. Those clusters might form one mechanical unit, but they might also be composed of separate mechanical entities.

If different combinations of different printed wiring boards (forming different clusters) are to be connected via dedicated connections within the backplane, the amount of possible combinations is limited and the backplane costs will be increased. There is little flexibility. If additional, not predesigned combinations of PWBs shall be added later, e.g. for upgrading the telecommunication systems, a redesign of the backplane will be necessary. This leads to additional costs and interferes with backwards compatibility concerning already installed bases at a customer's site.

Combining several PWBs into clusters, forming specialized plug-in units will make the number of different individual clusters will be very high because different numbers and combinations of different PWBs will be configured as clusters. The large amount of different predesigned clusters results in higher logistic costs at manufacturing. Moreover, the weight of one cluster, which is the sum of the individual PWBs combined, will increase, making the cluster more difficult to handle. Additionally, by combining several PWBs into one cluster, it may be expected that the mean time between failures (MDPF) will decrease.

The invention provides an optical DWDM system which allows easier and more flexible modification and upgrade of the system configuration.

SUMMARY

This object is solved by providing a connector panel for plug-in units in a telecommunication system according to claim 1 and by the shelf device of claim 11. Embodiments of the invention are defined in the dependent claims.

According to one aspect, the invention provides a connector panel for plug-in units in a telecommunication system, the telecommunication system including a sub-rack or shelf having a backplane for power supply of a number of N plug-in units within the shelf and for enabling the N plug-in units within the shelf to communicate with each other. The connector panel is an entity separate from the backplane and includes a number of n connecting units providing an interface between n dedicated plug-in units among the N plug-in units within the shelf, with 2≤n<N. The connector panel is configured to be removably attached at an interior side of a wall of the shelf.

According to this aspect, a relatively simple connector panel is added to the operating shelf (sub-rack) of the telecommunication system wherein the connector panel, in addition to the already existing backplane, can be attached at an interior side of the back wall of the shelf, for example. This additional connector panel allows connecting a number of selected plug-in units to form a multi-PWB operating cluster. The connector panel is simply attached at the back wall of the shelf, basically within the same plane as a common backplane, and at least two dedicated plug-in units will be combined by the connector panel by inserting the respective plug-in unit into those slots within the shelf, where the connector panel is mounted. The connector panel will only be used when needed and can be adapted according to the requirements of each individual cluster to be designed. The only modification of the dedicated plug-in unit will be that it will have a dedicated plug unit, mating with the connector panel, at its rear edge. Instead of having pre-designed clusters, clusters can be configured flexibly by inserting more or less dedicated plug-in units into the shelf and connecting the dedicated plug-in units via the connector panel.

It is possible to provide a connector panel configured to connect a maximum of n plug-in units for forming a cluster of n sub-modules wherein not all of the n sub-modules need to be provided from the outset, but sub-modules may be added or exchanged during the lifetime of the telecommunication system by simply inserting or exchanging plug-in units connected via the connector panel. The connector panel hence allows easy configuration of clusters of a telecommunication system, and even upgrading and reconfiguration of said cluster without having to redesign the cluster components.

The invention provides a solution with minimum begin-of-life costs both for hardware and logistics. The invention further provides maximum flexibility for the individual definition of different connector panels for forming different types of clusters. The invention further allows extension and reconfiguration of clusters without any need for redesign. The invention further allows reconfiguration and/or upgrading of a telecommunication system according to requirements which will be defined only in the future. There is a minimum impact on existing systems, with full backwards and forwards compatibility.

The shelf may have a backplane for power supply of the plug-in units, in addition to the connector panel. But, when designing the backplane, it is not necessary to take into account requirements of any clusters.

In one example, the connector panel includes an alignment component for aligning the n connecting units to mating connectors of the plug-in units. Said aligning component may comprise at least one of a pin, a wedge, and an inclined surface, for example. By providing said alignment component, it is possible to pre-center the connecting units of the connector panel to mating connectors of the plug-in units in order to easily insert the plug-in units. This is particularly effective when the plug-in units also are to be aligned relative to mating connectors provided on the backplane. A connecting unit of the connector panel may comprise one or more connectors, such as plugs or sockets mating with corresponding sockets or plugs provided at the rear edge of the plug-in units.

The connector panel may further include means for attaching the connector panel at the interior wall of the shelf allowing for limited lateral movement of the connector panel relative to the wall. Said attaching means may comprise at least one attachment component, such as at least one of a leg or a snap arm mating with a corresponding recess in the interior wall of the shelf or in a carrier attached thereto, or it may comprise a recess mating with a corresponding leg or snap arm at the wall of the shelf; and a biased retaining element, such as a spring-loaded ball or slider, for example. Mounting the connector panel at the interior wall of the shelf in such a way that a limited lateral movement of the connector panel is allowed, has the effect that the loosely mounted connector panels may absorb manufacturing tolerances of the shelf and plug-in units. The final position of the connector panel then will be determined only once the plug-in units have been inserted into the shelf. It is possible to secure the rough position of the connector panel by some biased retaining element, such as a spring-loaded ball or slider which is aligned with some receiving hole in the mechanics of the shelf.

The connector panel is configured to be removably attached at the interior wall of the shelf. The connector panel further may be configured to remain attached at the interior wall of the shelf when one or more of the dedicated plug-in units are removed. If the connector panel is attached at the interior wall of the shelf in such a way that it will remain attached when one or more plug-in units are removed or exchanged, any cluster can be mounted or dismounted or reconfigured without having to shut-down the telecommunication system.

The connector panel may include n connector plugs for electrically and/or optically connecting the dedicated plug-in units. A connecting unit may comprise one or more connector plugs or sockets. The connector panel also may include means for detecting a plug-in unit inserted into a corresponding connecting unit and for verifying whether a detected plug-in unit is one of the n dedicated plug-in units. This detecting means might also be useful for verifying if a detected plug-in unit is supported by this kind of connector panel irrespective of its current use in the system of concern. Said detecting and verifying means may comprise an electronic memory, such as an EEPROM, storing data for verifying one or more predetermined types of plug-in units, for example. Based on data stored in the EEPROM, a controller can verify which type of functional modules have been plugged-in and, even if an individual module operates correctly, issue an error message if the module does not correspond to the expected dedicated plugged-in unit. This verification also can be based on other types of electric or electronic or even mechanical detecting and verifying means.

In a further aspect, the invention provides a shelf device of a telecommunication system including a connector panel as just described above. The shelf device further includes a chassis having a wall; and a support rail for the connector panel attached at the interior side of the wall. The support rail may comprise at least one attachment component for attaching the connector plug thereto, such as recesses or other suitable attachments.

Further, a backplane may be provided. The backplane comprises backplane plugs or sockets and the connector panel comprises connector plugs or sockets. The connector plugs or sockets provide interface capabilities not provided by the backplane plugs or sockets, including at least one of an interface having a higher data transmission rate and/or data transmission capacity than that of the backplane plugs or sockets, and/or an optical interface. As one example, if the invention is used in a telecommunication system configured for a maximum bit rate of 100 Gbit/s per wavelength, clusters and associated connector plugs or sockets may be configured for 200 Gbit/s or even more than 200 Gbit/s applications. Dedicated clusters for such 200 Gbit/s or more Gbit/s applications hence can be introduced without the need for redesigning the backplane for providing the necessary interconnects. The connector panel can be mounted both at the factory and at a customer's site. It then simply needs to be attached to the interior wall of the shelf chassis. The respective plug-in units for the 200 Gbit/s or more Gbit/s applications are designed to have a corresponding plug or socket at their rear edge.

The connector panel provides an interface for n dedicated plug-in units forming a cluster. The cluster may comprise a master board (as a first type of dedicated plug-in unit) and at least one slave board (as a second type of dedicated plug-in unit), the connector panel providing a high-speed interface between the master board and the at least one slave board. The cluster may be part of an optical DWDM system. The master board may comprise a control unit for verifying and controlling any slave boards provided by the further plug-in units of the cluster.

Furthermore, the invention provides a method for connecting n plug-in units in a shelf or sub-rack of a telecommunication system with the shelf being adapted to accommodate a number of N plug-in units with N>n. A connecting device provides a communication interface among the n plug-in units. Furthermore, the connecting means is an entity separate from the shelf and the plug-in units, and it is removably attached to the shelf. The connecting means might be formed by the connector panel described above.

The terms shelf and sub-rack will be used interchangeably in this patent application.

SHORT DESCRIPTION OF DRAWINGS

Examples of the invention shall now be described with reference to the drawings, wherein.

DESCRIPTION OF EXAMPLES

Figure 1:
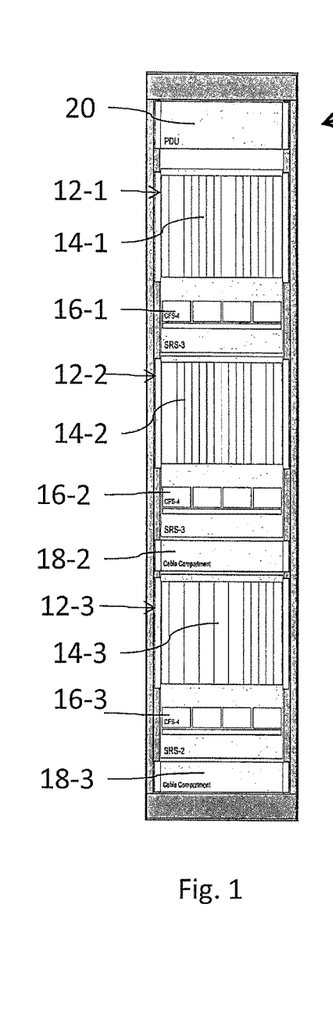
FIG. 1 shows a schematic front view of a rack for an optical telecommunication system, including a number of shelves, according to one example.

FIG. 1 schematically shows an example of a rack 10 accommodating three shelves 12-1, 12-2, 12-3 of an optical telecommunication system. The system may be a multi-channel optical packet transport platform, such as the 96-channel DWDM platform hiT 7300 addressed above. While in this description reference may be made to specific telecommunication systems or functional components and modules, it will be understood that this description serves only as an example for illustrating the invention, without limiting the invention to any particular system, components, operational modules etc.

In the example shown in FIG. 1, each shelf 12-1, 12-2, 12-3 comprises a compartment 14-1, 14-2, 14-3 including a number of slots for receiving plug-in units and a fan pack zone 16-1, 16-2, 16-3 including four cooling fan packs per shelf. The rack 10 further provides two cable compartments 18-2 and 18-3. A power distribution unit (PDU) 20 is provided as a fuse or breaker panel for rack 10.

Rack 10 by and large may be a standard telecommunication rack, meeting all relevant ETSI (European Telecommunications Standards Institute) and ANSI (American National Standards Institute) standards. There can be three or more sub-racks or shelves per rack wherein each shelf 12-1, 12-2, 12-3 includes a number of slots, for example 15+1 or 13+1 slots. The invention does not require any modification of the rack 10 concerning standards, dimensions, fan pack, cable management, rack layout, etc. In addition to the existing and known functionality, at least one of the shelves 12-1, 12-2, 12-3 will be configured to contain at least one additional connector panel to form special combinations of individual PCBs for configuring individual clusters. The invention allows to configure clusters from using two slots up to n slots, wherein n<N, with N being the total number of slots per shelf.

Figure 2:
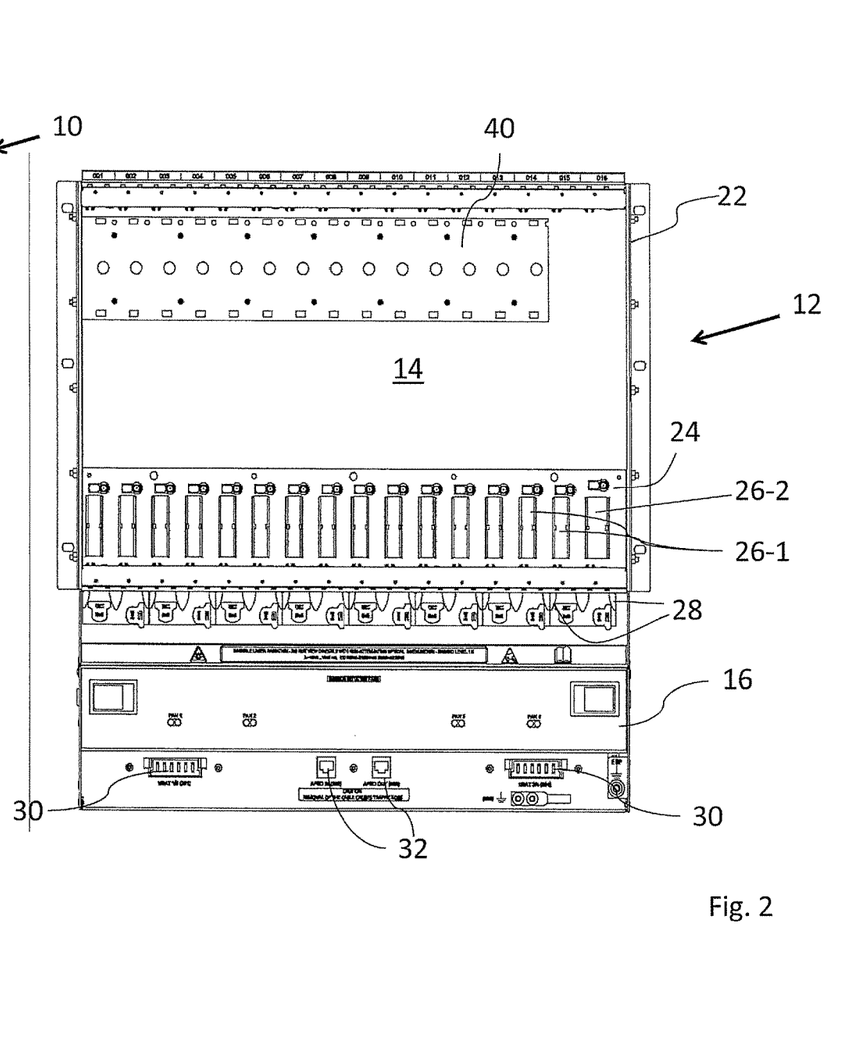
FIG. 2 shows a front view of a chassis of a shelf, according to one example.

FIG. 2 shows an example of a chassis of one of the shelves 12 before the additional connector panel has been mounted and without any plug-in units being inserted. The shelf 12 includes a chassis 22 which basically is a metal box for installing required components and connectors. The chassis 22 defines a compartment 14 and a backplane 24 is mounted within the compartment 14 to the interior side of the back wall of the chassis 22. The backplane 24 comprises 15+1 plugs 26-1, 26-2, in this example. Of course, any other number of slots and plugs may be provided. In this example, 15 of the plugs 26-1 (first type of plug) are configured to receive plug-in units of a first type which provide functional modules of the telecommunication system. The 16$^{th}$ plug 26-2 (second type of plug) is configured to receive a plug-in control unit for monitoring and controlling operation of the functional modules (plug-in units of the first type) installed in the respective shelf. The backplane 24 provides the necessary connections for power supply of the plug-in units and for enabling communication of the first type of plug-in units with the plug-in control unit. The backplane does not have to provide additional interfaces for allowing selected plug-in units for communication from board to board to form a cluster.

At a different system configuration, the backplane is designed with a predetermined layout and is configured for predetermined applications to provide a predetermined number of optical channels having a predetermined transmission capacity. In one example, the overall system could, for example, have a maximum transmission capacity of 9.6 Tbit/s (96 channels per 100 Gbit/s) per fiber with 50 GHz channel spacing.

The shelf 12 further comprises a support rail 40 to which one or more connector panels can be attached. The support rail 40 may be a sheet-metal component fixed to the interior back wall of the shelf 12. The support rail 40 comprises an attachment component, such as recesses 46 for attaching a connector panel (not shown in FIG. 2).

The shelf 12 further includes means 28 for guiding electrical and/or optical cables. In FIG. 2, a fan pack zone is provided at 16, the fan pack zone in this example comprising four fan packs for cooling the sub-rack and its components. Additionally, the shelf 12 comprises connectors 30 for power interface, electrical communication and means 32 for grounding and ESD protection.

Figure 3:
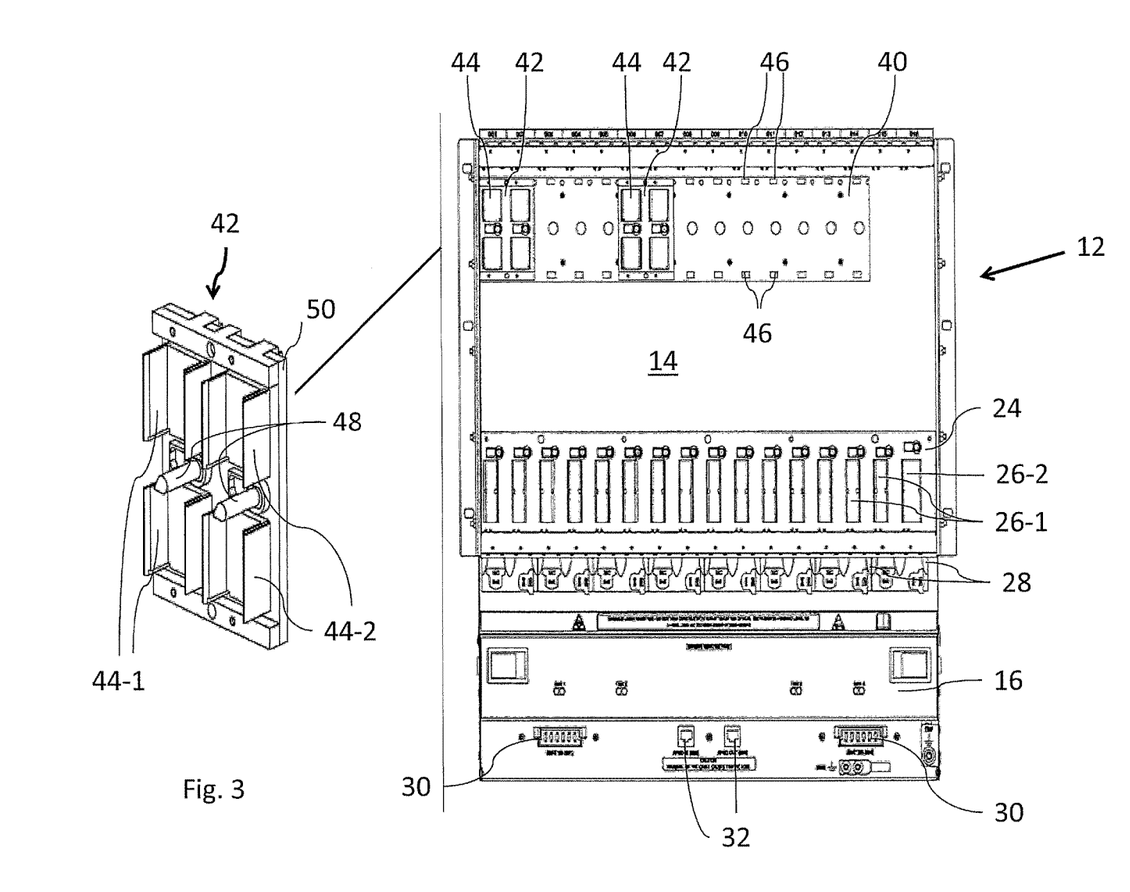
FIG. 3 shows a front view of a chassis of a shelf including a connector panel, according to one example.

FIG. 3 shows a similar view of a shelf 12 as in FIG. 2 wherein the same components are designated by the same reference numbers. The shelf of FIG. 3 is shown with two connector panels 42 attached to the support rail 40, wherein one of the connector panels 42 is shown in an enlarged perspective view on the left-hand side of FIG. 3. In the example of FIG. 3, each connector panel 42 includes two sets of connector plugs, schematically shown at 44-1 and 44-2. Two vertically aligned connector plugs 44-1 and 44-2 form a connecting unit for one plug-in unit each. In the example shown in FIG. 3, each connector panel 42 is configured as a connection device to provide an interface for two dedicated plug-in units.

While not shown in detail, the connector panel 42 comprises an attachment component, such as at least one projection mating with one of the recesses 46 of the support rail 40 to removably attach the connector panel 42 to the support rail 40. The respective attachment component can be configured such that a limited lateral movement of the connector panel 42 relative to the support rail 40 is allowed so as to more easily align and insert plug-in units. While not shown in detail, the respective attachment component may comprise a leg or snap arm mating with a corresponding recess. Additionally, a biased retaining element may be provided, such as a spring-loaded ball or slider for biasing the connector panel 42 relative to the support rail 40 so that there is no uncontrolled relative movement.

In the example shown in FIG. 3, the connector panel 42 further carries an alignment component in form of pins 48 protruding from the surface of the connector panel 42. The pins 48 serve to pre-align a plug-in unit to be inserted into the shelf 12 and to be connected to one of the pairs of connector plugs 44. Instead of alignment pins 48, other alignment means may be provided, such as a wedge or an inclined surface, with corresponding alignment means on the mating surface of the plug-in unit.

The connector panel 42 further includes a multi-layer printed circuit board 50 providing dedicated connections between the plugs 44-1 and 44-2 to be associated with respective plug-in units. The connections provided by PCB 50 may be high-speed connections, providing a higher data transmission rate, when compared to the connections provided by the backplane 24.

The support rail 40 shown in FIG. 2 and FIG. 3 is configured in such a way that it can receive a number of connector panels 42 wherein each connector panel may comprise two or more pairs of plugs for interfacing two or more plug-in units. In the example shown, the dedicated connector panels 42 may be configured to connect any one of the plug-in units, which are received by plugs 26-1. Preferably, neighboring plug-in units are connected via the dedicated connector panel 42 to form a cluster. In this example, plug 26-2 is to be associated with a plug-in control unit.

The support rail 40 will be fixed to the back side of the shelf 12, such as by screws, rivets or welding. As described above, the connector panels 42 are removably attached to the support rail 40 in such a way, that the attachment allows some limited lateral movement of the connector panel 42 relative to the support rail 40. When a plug-in unit is inserted into the shelf 12, it needs to be aligned with both the corresponding plug 26-1 of the backplane 24 and the respective pair of plugs 44-1 or 44-2 of the connector panel 42, if the plug-in unit is part of the cluster. The plug 26-1 of the backplane 24 usually is rigid and the plug-in unit needs to be aligned precisely relative to the backplane 24. Aligning the plug-in units also to the plugs of the connector panel 42 hence is greatly facilitated by the limited lateral movement of the connector panel 42. Once the plug-in unit has been inserted, the position of the connector panel 42 is fixed. As described above, an alignment component 48 provided on the connector panel 42, interacts with the corresponding alignment component on the side of the plug-in unit, and optional biasing device can assist in the alignment process.

While the connector panel 42 is removably attached to the support rail 40, such as by legs which are inserted into the recesses 46, the connector panel 42 will remain attached to the support rail 40 when one or more of the dedicated plug-in units are removed and/or exchanged. This way it is possible to insert, remove or exchange individual plug-in units without interrupting the traffic provided by shelf 12.

As also described, the connector panel 42 may provide an electrical and/or optical interface between the dedicated plug-in units. The dedicated connector panel 42 provides a dedicated interface for forming a cluster for a number of plug-in units, the interface providing a high data transmission rate, such as 28 Gbit/s.

While not shown in detail, the connector panel 42 additionally may provide means for detecting whether a plug-in unit has been inserted into a respective connector plug and for verifying whether a detected plug-in unit is the one which should be inserted. While such detecting and verifying means may be provided by some mechanical references, it preferably comprises an electronic memory, such as an EEPROM, storing data for verifying one or more predetermined types of plug-in units.

Whenever reference is made to a "plug" in this disclosure, it should be understood that the "plug" may be replaced by a socket or other suitable connecting means. Moreover, it may be contemplated to replace some or all of the physical connections provided the backplane by a wireless connection.

Figure 4:
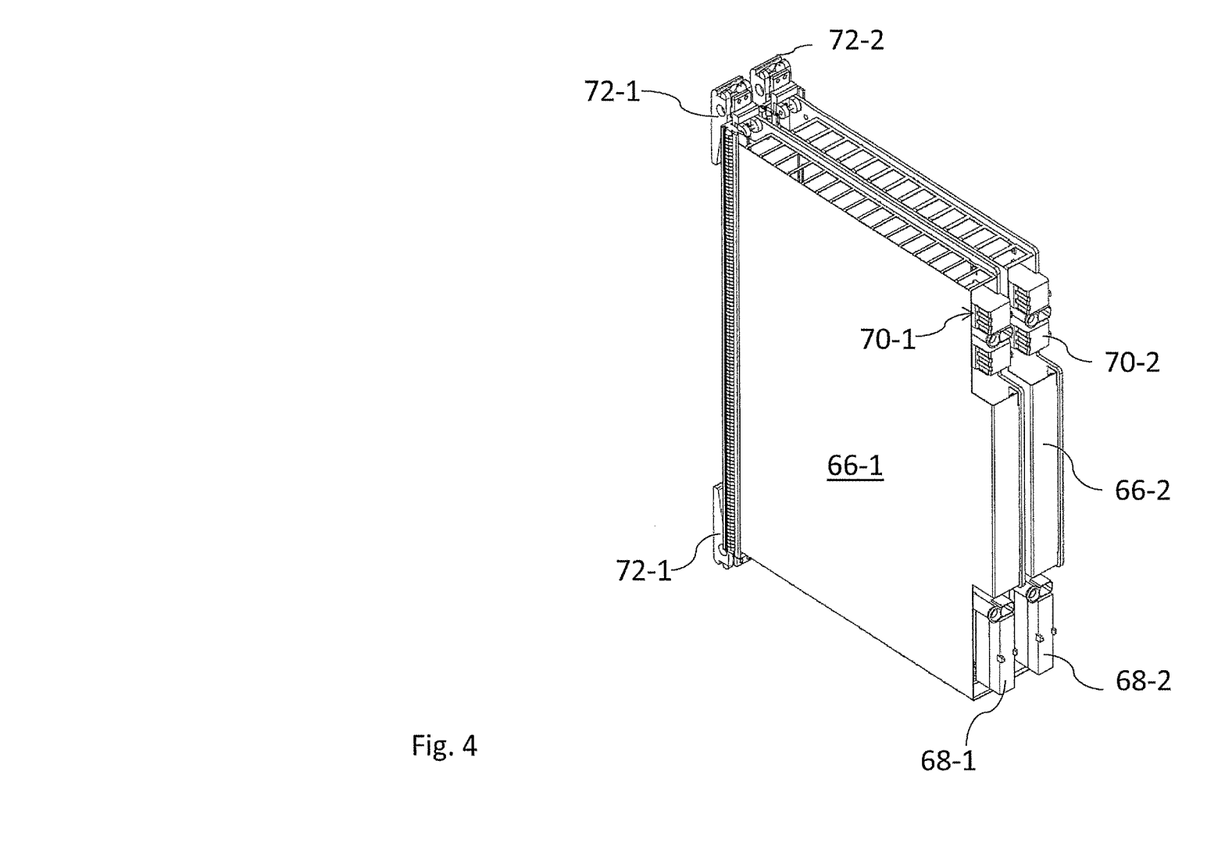
FIG. 4 shows a perspective view of plug-in units to be inserted into the shelf of FIG. 3, according to one example.

FIG. 4 shows a perspective view of a number of plug-in units which may form a cluster, according to one example. In the example of FIG. 4, a first plug-in unit is designated 66-1 and a second plug-in unit is designated 66-2. Each of the plug-in units comprises a backplane interface connector 68-1, 68-2 and an interface connector 70-1, 70-2 to the connector panel 42. The plug-in units 66-1, 66-2 further comprise attachment components 72-1, 72-2 for mechanically attaching the plug-in units to a respective shelf. The plug-in units 66-1, 66-2 shown in FIG. 4 may form a cluster which is connected by a dedicated connector panel 42, such as the one shown in FIG. 3, in addition to be connected to backplane 24. The plug-in units 66-1, 66-2 are connected to the connector panel 42 and the backplane 24 simply by inserting the plug-in units into the shelf. This may be done even during operation of the shelf wherein it is not necessary to interrupt the traffic.

Figure 5:
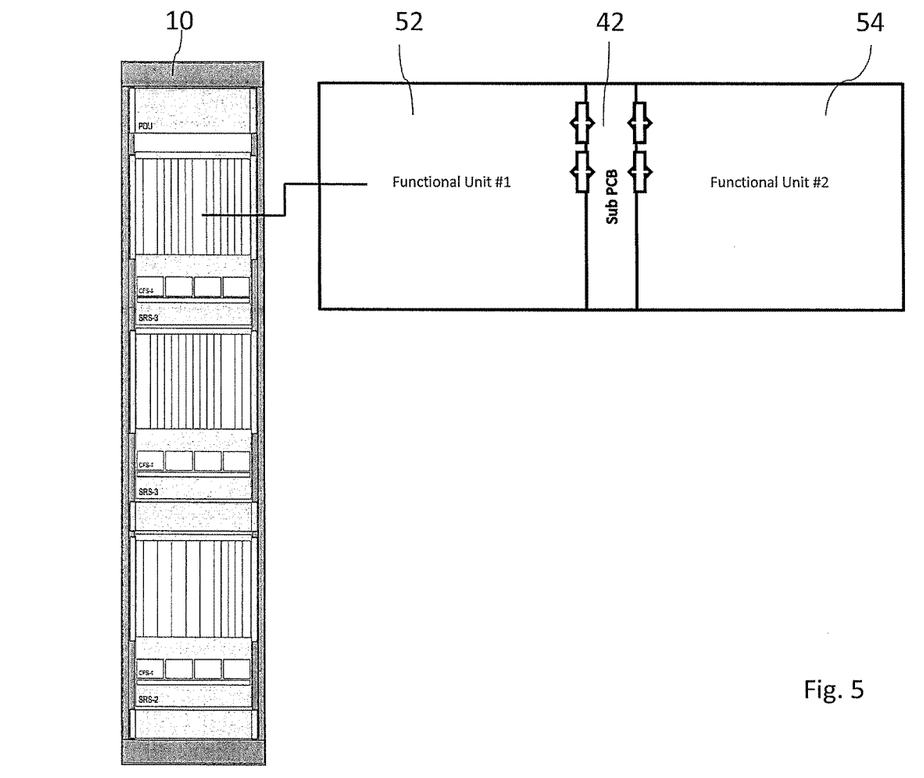
FIG. 5 schematically illustrates the configuration of a cluster, according to one example.

FIG. 5 shows an example for forming a cluster from a number of dedicated plug-in units. As shown in this figure, the respective clusters may be inserted into the rack 10 at different positions. While not described in detail, rack 10 including shelves 12 is essentially configured as described with respect to FIGS. 1 to 3. The connector panel 42 will have the necessary number of plugs and interconnections. Having regard to the rack 10 and shelves 12, reference is made to the description of FIGS. 1 to 3.

FIG. 5 shows an example of a two-slot cluster group, the cluster including a first plug-in unit 52 and a second plug-in unit 54 coupled by a connector panel 42. The first plug-in unit 52 comprises a client side card and the second plug-in unit 54 comprises a line side card, for example. The client side card comprises a first functional unit and any necessary transceivers or other interfaces. The line side card 42 comprises a second functional unit. The first and second functional units are separate plug-in units. The cluster is configured via the specifically designed and mounted connector panel 42 providing the necessary interface. For the communication within this cluster, the backplane 24 is not necessary. While the overall cluster also will be connected to the backplane, this is done only for standard communication functions control and power supply, but not for the internal communication within the cluster.

Other cluster groups can be provided, such a three-slot, four-slot etc. cluster groups, coupled by a respective connector panel.

The provision of the connector panel for individually interfacing dedicated plug-in units for forming a cluster has the effect that it minimizes the impact on an existing system, when plug-in units and clusters are exchanged, supplemented and/or upgraded. The connector panel allows the individual combination of plug-in units, including plug-in units which shall be designed only in the future. The invention hence minimizes costs at the time of manufacture and logistic costs and maximizes flexibility.

The invention claimed is:

1. A connector panel for plug-in units in a telecommunication system, the telecommunication system including a sub-rack or shelf adapted to accommodate a number of N plug-in units within the shelf and for enabling the N plug-in units within the shelf to communicate with each other;
   wherein the connector panel is an entity separate from the shelf and includes a number of n connecting units providing an interface between n dedicated plug-in units among the N plug-in units within the shelf, with 2≤n<N; and
   wherein the connector panel is configured to be removably attached to an interior wall of the shelf.

2. The connector panel of claim 1 wherein the shelf includes a separate backplane for power supply.

3. The connector panel of claim 1 including an alignment component for aligning the connectors to mating connectors of the plug-in units.

4. The connector panel of claim 3, wherein the alignment component comprises one or more of: a pin, a wedge, or an inclined surface.

5. The connector panel of claim 1 including an attachment component for removably attaching the connector panel to the interior wall of the shelf allowing for limited lateral movement of the connector panel relative to the interior wall.

6. The connector panel of claim 5 wherein said attachment component comprises at least one of a leg or a snap arm mating with a corresponding recess at the interior wall of the shelf or a recess mating with a corresponding leg or snap arm at the interior wall of the shelf; and a biased retaining element, such as a spring-loaded ball or slider.

7. The connector panel of claim 1 wherein the connector panel is configured to remain attached at the interior wall of the shelf when one or more of the dedicated plug-in units are removed.

8. The connector panel of claim 1 including n connecting units for electrically and/or optically connecting the dedicated plug-in units.

9. The connector panel of claim 8 including means for detecting a plug-in unit inserted into a respective connecting unit and for verifying whether a detected plug-in unit is one of the n dedicated plug-in units.

10. The connector panel of claim 9 wherein the detecting and verifying means comprises an electronic memory, such as an EEPROM, storing data for verifying one or more predetermined types of plug-in units.

11. A shelf device of a telecommunication system including a connector panel for plug-in units in a telecommunication system, the telecommunication system including a sub-rack or shelf adapted to accommodate a number of N plug-in units within the shelf and for enabling the N plug-in units within the shelf to communicate with each other;
   wherein the connector panel is an entity separate from the shelf and includes a number of n connecting units providing an interface between n dedicated plug-in units among the N plug-in units within the shelf, with 2≤n<N; and
   wherein the connector panel is configured to be removably attached to an interior wall of the shelf; the shelf device further including
   a chassis having a wall; and
   a support rail for the connector panel attached to the interior side of the wall.

12. The shelf device of claim 11, wherein the connector panel is configured to be removably attached to the interior wall of the shelf via the support rail.

13. The shelf device of claim 12, wherein the support rail is fixed to the wall of the chassis and comprises a number of recesses, and wherein the connector panel comprises at least one leg or snap arm mating with a corresponding recess of the support rail for removably attaching the connector panel to the support rail.

14. The shelf device of a telecommunication system of one of claim 13 having a backplane attached to the interior side of the wall.

15. The shelf device of claim 14;
   wherein the connector panel provides interface capabilities not provided by the backplane, including at least one of an interface supporting a higher data transmission rate and/or data transmission capacity than that of the backplane plugs, and an optical interface.

16. The shelf device of claim 15, wherein the connector panel provides an interface for n dedicated plug-in units forming a cluster.

17. The shelf device of claim 16 wherein the cluster comprises a master board (first dedicated plug-in unit) and at least one slave board (second dedicated plug-in unit), the connector panel providing a high-speed interface between the main board and the at least one slave board.

18. A method for connecting n plug-in units in a shelf of a telecommunication system, the shelf being adapted to accommodate a number of N plug-in units, with N>n; the method comprising:
   providing a connection device as a communication interface among the n plug-in units and removably attaching the connection device to the shelf;
   forming a cluster of two or more of the n plug-in units in the shelf by plugging in the two or more plug-in units into corresponding slots of the connection device; and
   establishing communication between the two or more plug-in units via the connection device.

* * * * *